Patented Feb. 13, 1951

2,541,022

UNITED STATES PATENT OFFICE 2,541,022

CONTINUOUS PROCESS FOR MANUFACTURE OF VINYL CHLORIDE

George E. Baxter, Grand River, Ohio, assignor to Diamond Alkali Company, Cleveland, Ohio, a corporation of Delaware No Drawing. Application January 2, 1947, Serial No. 719,919

4 Claims. (Cl. 260—656)

This invention relates to the production of vinyl chloride by chemical dehydrochlorination of ethylene dichloride and more particularly relates to a continuous process for obtaining vinyl chloride, which is characterized in that high yields of the desired product are obtained and all other reactants may be suitably recovered and recycled in the reaction.

The obtaining of vinyl chloride by chemical dehydrochlorination of ethylene dichloride is well-known and has heretofore been relatively widely practiced. The reaction, however, is subject to many difficulties in its accomplishment and has particularly been found by prior investigators to result in a substantial number of undesired secondary products whereby the yield of vinyl chloride itself is not sufficiently substantial to be of interest. Thus, prior investigators have found it necessary to use substantial quantities of alcohol, which alcohol is subsequently lost, and have also found that the large amount of salt which forms at the locus of the reaction substantially cakes the apparatus and prevents the obtaining of satisfactory yields of the desired vinyl chloride. It has similarly been suggested that aqueous caustic solutions be employed to avoid the loss of alcohol and the excessive salt caking. These reactions have been found to run even at high temperatures with very little efficiency and furthermore, where high temperatures have been employed, operation in a pressure system is necessary with the consequent disadvantages which flow therefrom.

It has also been proposed to avoid the formation of undesired by-products by providing a body of ethylene dichloride and treating the same in the presence of water and alcohol with an amount of caustic soda equal to less than the equivalent of ethylene dichloride. This method, whatever may be its efficiency, has only been suggested for use on a batch basis and is thus subject to all disadvantages, particularly from the operational standpoint, which characterize batch operations.

The present invention has as its object the avoidance of the various disadvantages and inefficiencies of the prior art and more particularly the provision of an efficient continuous operation which, though it employs relatively impure reactants throughout, results in high yields of vinyl chloride of high purity and in which all reactants may be efficiently recycled to obtain such maximum yield at lowest possible costs.

In fulfilling these objects the present invention contemplates the provision of a body of a solution comprising aqueous caustic alkali and alcohol into which is gradually introduced ethylene dichloride whereby a reaction takes place with the production of vinyl chloride. It is a feature of the invention that the caustic is maintained at all times in large excess to the ethylene dichloride. The vinyl chloride formed in the reaction, together with any unreacted materials, may be passed through a secondary reaction zone and collected. To maintain said excess of caustic, aqueous alcoholic alkali solution may be introduced continuously, preferably through said zone, and exhausted salt containing alkali solution continuously removed from said body. Vinyl chloride in high yield and purity is continuously evolved and collected.

More particularly, in accordance with the present invention, aqueous caustic alkali, which may be commercial, relatively impure caustic soda solution, such as electrolytic caustic solution as obtained from electrolytic cells and concentrated to the desired concentration, is combined with an alcohol, the concentration being such that substantially no solid alcoholate or caustic hydrate forms in the solution. It has been found preferable to use caustic soda solution having at least 30% concentration of sodium hydroxide therein but ordinary 50% caustic liquor has been found to be most advantageous for use in the method and is, of course, most easily available for the purpose. Of the alcohols which may be used, the lower monohydric alcohols, such as methanol and ethanol, are preferred and in particular, methanol because of its easy availability, relatively high solubility in combination with caustic and water, and relative cheapness is preferred. Any combination of methanol and caustic soda aqueous solution may be used but it has been found preferable to use at least three parts of alcohol to four parts of 50% caustic solution in order to avoid the formation of a solid alcoholate or caustic hydrate, which would block the reaction system.

In one of the embodiments of this invention an aqueous solution containing 50% electrolytic caustic soda has been combined on a 1-1 volume basis with methanol and found to operate in an entirely satisfactory manner in the reaction. Such a solution may initially be charged to a reaction vessel into which gradually is added ethylene dichloride. For this purpose ethylene dichloride of a relatively impure character may suitably be employed, the presence, for example, of some propylene dichloride resulting only in the production of various higher chlorides, which may subsequently easily be separated from vinyl chloride by distillation. The reaction vessel is preferably provided with a suitable outlet to remove exhausted caustic and precipitated sodium chloride and in order to keep the sodium chloride from caking in the vessel, suitable agitation may be included. In addition to the body of aqueous methanol caustic solution, further caustic solution in methanol may be added gradually to the reaction vessel and it is a feature of this invention that this further added material may be introduced into the reaction vessel in counter-current relationship to the vinyl chloride formed by the reaction and to other materials distilling therewith. For the purpose of obtaining contact between the entering caustic methanol solution and the issuing vinyl chloride and other products, it has been found desirable to employ a conventional packed column containing any suitable surface providing objects, such as Raschig rings, the packing and the column itself, of course, being entirely inert to the reactants. The packed column or equivalent structure provides a secondary zone of reaction wherein a desirable heat exchange is effected between the ascending vinyl chloride gas and the descending caustic solution. In addition, further reaction surface is provided for the conversion of escaping unreacted ethylene dichloride whereby the overall yield of vinyl chloride is substantially increased. An additional function of the secondary reaction zone is to scrub out escaping methanol vapors whereby the loss of methanol is kept extremely low and the efficiency and cheapness of the reaction is accordingly enhanced.

It has been found preferable to operate the reaction at atmospheric pressure, collecting the vinyl chloride after it has passed through the secondary reaction zone, and after drying in any convenient manner, presumably under pressure in its liquid form. The feature of operation at atmospheric pressure, however avoids the expensive disadvantage of employing pressure reaction vessels and in general, renders the entire operation much simpler to control.

It has been found that the reaction runs efficiently at temperatures of the order of 50 to 75° C. and that these temperatures may in part be achieved by the combination of methanol and aqueous caustic solution in the desired proportions immediately prior to using the same. However, external heat may be applied to the reaction vessel, if necessary, in order to maintain the temperature within the zone of efficiency. It has been found preferable, in general, to avoid temperatures in excess of 70° C., particularly to obviate excessive refluxing. For example, at temperatures substantially in excess of 70° C., when a secondary reaction zone is employed, sodium chloride may deposit therein causing clogging thereof. In the event, however, that such clogging occurs, the zone may suitably be flushed with water, the wash solution running into the main reaction zone from which it may be drawn off at the normal outlet for exhausted caustic and sodium chloride solution.

While any desired relative concentrations of caustic and ethylene dichloride may operably be used in the reaction, it has been found preferable and is a feature of the invention that a large excess of caustic to ethylene dichloride be employed. Thus, it is preferred to introduce sufficient aqueous caustic alkali in alcohol solution to have present at all times at least 4 to 5 times the theoretically necessary amount of sodium hydroxide whereby a sufficiently strong caustic solution to enter into the reaction efficiently is continuously present. Furthermore, an additional advantage obtains from maintaining a high ratio of caustic to ethylene dichloride in that the salt containing solution withdrawn from the reaction vessel is relatively concentrated in caustic soda even after reaction and does not require extensive reconcentration in order to achieve its original strength.

The reaction may suitably be run in glass apparatus but on a larger scale is preferably operated in metallic vessels and for this purpose, I have found it preferable to employ nickel or other metals in which metallic ion pickup in the caustic is relatively low. If the caustic used is not seriously reduced in subsequent value or usefulness by iron pickup, then iron vessels with their advantage in cheapness may also be employed.

The description above has discussed the method as it specifically relates to the use of caustic soda but it will be appreciated that other alkali metal hydroxides may be used in the operation of the method without departing from the scope of the invention herein.

In order that the invention may be fully understood and that a method of its actual practice may be set forth, the following example is included.

*Example*

A 3 neck flask provided with a side-arm in the body thereof is equipped with a driven stirrer through a mercury seal, a dropping funnel for ethylene dichloride, and a column filled with Raschig rings, the top of the column having mounted thereover a water-filled condenser and being provided with means for introducing caustic methanol solution. The flask is charged to the level of the side-arm with 800 cc. of a 1-1 solution of 50% aqueous NaOH solution and methanol. With the caustic methanol mixture in the flask maintained by external heating at a temperature between 50 and 70° C., 2015 gms. of ethylene dichloride are added dropwise over a space of 16½ hours with the stirrer running in the flask. Over the same period of time 11,600 cc. of additional aqueous caustic methanol solution are added through the packed column. A total of 1214.5 gms. of vinyl chloride is collected through the packed column and is recovered as it comes from the condenser. This amounts to a yield of 95.5% based upon the input materials. Caustic-sodium chloride-methanol mixture continuously drawn off from the side-arm of the reaction flask is first settled to remove solids, such as sodium chloride, and next distilled to remove methanol and then reconcentrated. Any remaining sodium chloride precipitates and the reconcentrated caustic is returned to the system for further use. The vinyl chloride is recovered with small amounts of methanol and unreacted ethylene dichloride and a distillation separation effected, both the methanol and ethylene dichloride being returned to the system for further reaction.

While there have been described in detail certain forms of this invention and a specific example of its practice, the invention is not to be understood as being limited to such example as it is realized that changes within the scope of the invention are possible, and it is further intended that each step in the following claims shall refer to all equivalent steps for accomplishing the same result in substantially the same or equivalent manner, it being intended to cover this invention broadly in whatever form its principle may be utilized.

What is claimed is:

1. The continuous method of making vinyl chloride by dehydrochlorination of ethylene dichloride, which includes the steps of providing a body of solution comprising aqueous caustic alkali and a lower-monohydric alcohol, continuously adding ethylene dichloride thereto, effecting the dehydrochlorination of said ethylene dichloride to vinyl chloride therein, continuously removing a portion of said body of solution, separately collecting alkali metal chloride, alcohol, and a solution comprising aqueous caustic alkali from said portion, reconcentrating said aqueous caustic alkali, continuously adding further solution comprising aqueous caustic alkali and alcohol to said body in countercurrent contact with vapors including vinyl chloride issuing from said body in an amount sufficient to maintain the concentration of said caustic alkali in said body in excess of that amount required to effect said dehydrochlorination, said further solution including caustic alkali recovered from said portion, and continuously collecting vinyl chloride from said vapors subsequent to the contact of said added solution therewith.

2. The method of claim 1 which includes the step of maintaining the body of solution comprising aqueous caustic alkali at a temperature within the range of 50° C.–70° C.

3. The method of making vinyl chloride by dehydrochlorination of ethylene dichloride, which includes the steps of providing a body of solution comprising aqueous caustic alkali and a lower monohydric alcohol, gradually adding thereto ethylene dichloride, effecting the dehydrochlorination of said ethylene dichloride to vinyl chloride, withdrawing an effluent mixture of vapors including vinyl chloride, alcohol, and ethylene dichloride from said body through a secondary reaction zone, adding further caustic and alcohol mixture to said body sufficient to maintain said caustic in constant stoichiometric excess to said ethylene dichloride, said caustic and alcohol mixture being added through said secondary reaction zone in contact with said effluent, simultaneously scrubbing said alcohol and dehydrochlorinating said ethylene dichloride in said effluent in said secondary reaction zone with said further aqueous caustic alkali and alcohol, maintaining the volume of solution in said body constant with said further aqueous caustic alkali in alcohol solution, and collecting vinyl chloride from said secondary reaction zone.

4. The continuous method of making vinyl chloride which includes the steps of providing a body of solution comprising aqueous caustic alkali and methanol, continuously adding ethylene dichloride to said solution, effecting the dehydrochlorination of said ethylene dichloride to vinyl chloride therein, continuously withdrawing distillable vapors comprising vinyl chloride, methanol, and unreacted ethylene dichloride from said body of solution, adding further caustic and methanol to said body in countercurrent contact with said vapors to maintain a constant stoichiometric excess of caustic to ethylene dichloride in said body, scrubbing out said methanol and dehydrochlorinating said ethylene dichloride from said vapors with said further aqueous caustic alkali and methanol, and separately collecting vinyl chloride subsequent to said contact.

GEORGE E. BAXTER.

REFERENCES CITED

The following references are of record in the file of this patent:

UNITED STATES PATENTS

| Number | Name | Date |
|---|---|---|
| 2,041,814 | Brous | May 26, 1936 |
| 2,148,304 | Ruys et al. | Feb. 21, 1939 |
| 2,322,258 | Strosacker et al. | June 22, 1943 |

FOREIGN PATENTS

| Number | Country | Date |
|---|---|---|
| 349,263 | Great Britain | May 28, 1931 |